United States Patent
Suzuki et al.

(10) Patent No.: US 6,425,270 B1
(45) Date of Patent: Jul. 30, 2002

(54) ROD IN TUBE METHOD OF FORMING A FIBER PREFORM, WITH MAINTAINING A GAS SUPPLY UNTIL AFTER AN END IS STRETCHED

(75) Inventors: Masanori Suzuki; Toshiyuki Kato; Atsuhi Shimada; Yutaka Watabe, all of Koriyama (JP)

(73) Assignees: Heraeus Quarzglas GmbH & Co. KG (DE); Shin-Etsu Quartz Products Co., Ltd. (JP)

(*) Notice: Subject to any disclaimer, the term of this patent is extended or adjusted under 35 U.S.C. 154(b) by 0 days.

(21) Appl. No.: 09/582,956
(22) PCT Filed: Nov. 8, 1999
(86) PCT No.: PCT/EP99/08538
  § 371 (c)(1),
  (2), (4) Date: Aug. 11, 2000
(87) PCT Pub. No.: WO00/27766
  PCT Pub. Date: May 18, 2000

(30) Foreign Application Priority Data
Nov. 9, 1998 (JP) ............................................ 10-317981

(51) Int. Cl.⁷ ...................... C03B 37/027; C03B 37/07
(52) U.S. Cl. ............................. 65/379; 65/412; 65/381; 65/501
(58) Field of Search .......................... 65/412, 379, 381, 65/489, 501

(56) References Cited

U.S. PATENT DOCUMENTS

| | | | | |
|---|---|---|---|---|
| 2,980,957 A | * | 4/1961 | Hicks | 65/412 |
| 4,793,842 A | * | 12/1988 | Yokota | 65/412 |
| 5,900,036 A | * | 5/1999 | Mossadegh | 65/412 |

* cited by examiner

Primary Examiner—John Hoffmann
(74) Attorney, Agent, or Firm—Milde & Hoffberg LLP

(57) ABSTRACT

A method for producing an optical fiber preform comprising inserting a core glass rod for use in the optical fiber preform into the quartz glass tube for the optical fiber preform and then welding them in a heating furnace to melt weld them together into a monolithic product, wherein the melting is started in such a state that the lower open edge of said quartz glass tube is placed inside the heating furnace and a gas is supplied from the upper edge of the tube, and after the lower edge portion of the quartz glass tube is drawn out from said heating furnace by melt deformation and stretching by the gravitational force, the gas supply is cut off and the pressure is reduced.

2 Claims, 1 Drawing Sheet

ROD IN TUBE METHOD OF FORMING A FIBER PREFORM, WITH MAINTAINING A GAS SUPPLY UNTIL AFTER AN END IS STRETCHED

INDUSTRIAL FIELD OF APPLICATION

The present invention relates to a method for producing an optical fiber preform. It further relates to a method for producing an optical fiber preform which can provide high quality optical fibers at a low cost. It also comprises melt welding the quartz glass tube for use in the optical fiber preform with the core glass rod for use in the optical fiber preform to obtain a monolithic product by switching from a pressurized state to a reduced pressure state.

Prior Art

Recently, mass production and the cost reduction of optical fibers are in high demand with increasing use of optical fibers in larger quantity. The mass production and cost reduction in the production of optical fibers can be accomplished most simply by forming a large optical fiber preform and by then drawing it. In the conventional practical method for producing optical fibers such as the vapor-phase axial deposition process (VAD) or the outer vapor-phase deposition process (OVD process), the core portion and the clad portion are all produced by VAD or OVD process. Thus, in case of scaling up, there was a disadvantage that the productivity of the fiber optical preform may be lowered. It one attempts to form a larger soot body (that is a precursor for an optical fiber preform which is a porous body obtained before vitrifying it into a transparent body), there may occur troubles such as the generation of cracks or the drop off of the porous soot body as to greatly lower the productivity. As a method for producing an optical fiber which overcomes the problems above, in JP-A-7-109136 and the like is proposed a production method, i.e., the so-called rod in tube method, which comprises forming the quartz glass tube for use as the clad portion accounting for 80% or more of the cross section area by a method capable of forming a high performance quartz glass tube and yet, of reducing cost, and then monolithically integrating the resulting quartz glass tube with the core glass rod formed by, for example, the VAD process or the OVD method. In the rod in tube method, in general, a gas is flown in the interstices between the quartz glass tube for optical fiber preform and the core glass rod for the optical fiber preform to prevent impurities and the like from being incorporated therein, or to control the OH groups (see JP-A-52-200042, JP-A-4-42848, JP-A-6-42848, and JP-A-6-21725). On the other hand, because the melt welding into a monolithic body should be performed under a reduced pressure, one end of the quartz tube for preforms must be sealed and the pressure be reduced before the melt welding. The maintenance of the pressure-reduced state is exemplified in, for example JP-A-7-196332 or JP-A-8-277138.

For the cost reduction in the rod in tube method, it is essential to effectively use the quartz glass tube for optical fiber preforms without making any loss, and it is therefore preferred to initiate the heat melting of the quartz glass tube for optical fiber preform from a portion as near as possible to the edge end of the quartz glass tube for optical fiber preforms. Furthermore, because the quartz glass tube for optical fiber preforms is expensive, generally, a dummy tube is used after the melt welding is performed to obtain a monolithic body for the portion before the dimension becomes stable as the optical fiber preform. The dummy tube is a tube that is connected to the quartz tube for optical fiber preforms above, and is made of an inexpensive quartz glass of a low quality such as those containing impurities, pores etc., at a large quantity. However, concerning the increase in total weight and the cost of the dummy tube itself, it is preferred that the dummy is provided at a length as short as possible and that the heat melting is initiated from the edge portion thereof To satisfy this requirement, the lower end portion of the quartz glass tube for optical fiber preforms, or the lower end of the dummy tube in case of using the dummy tube, is placed in side the heating furnace during heating up to the initiation of heat melting. However, if heating is performed in this state, the atmosphere that is not clean inside the heating furnace enters into the quartz glass tube. Accordingly, it is necessary to supply a gas from the upper end portion of the quartz glass tube to maintain the inside of the tube clean. On the other hand, in initiating the heating for melt welding the quartz glass tube for optical fiber preforms to obtain a monolithic product with the core glass rod for optical fiber preforms, the gas supply must be switched to reduce the pressure. However, this can be accomplished by sealing the end portion of the side from which melting is initiated. If the pressure reduction is started before sealing, particularly when the open end is still remaining inside the heating furnace, the atmosphere that is not clean inside the heating furnace is sucked into the tube. This produces an optical fiber preform in which the residual impurities or generated bubbles remain at the melt welded interface between the quartz glass tube and the core glass rod, and this results in an optical fiber having impaired properties. Thus, it is necessary to reduce the pressure after the end portion of the side from which melting is initiated is molten, stretched by gravitational force, and drawn out to the outside of the heating furnace from the lower side of the furnace. On the other hand the aperture area of the lower open end of the quartz glass tube for optical fiber preforms gradually decreases with progressive melting of the quartz glass tube due to the surface tension and the stretching in the longitudinal direction exerted by the gravitational force. However, in case of maintaining a constant pressure by using an ordinary regulator and the like or a gas supply using a flow control, the gas supply does not change even if the aperture portion is reduced by the melting of the quartz glass tube. Then, it happens that the portion just above the reduced aperture portion expands by the gas pressure, and this finally causes explosion. If the molten portion is observable, the gas supply rate can be reduced depending on the observed results, but it is difficult to observe the inside of the furnace.

SUMMARY OF THE INVENTION

It has been found that the above problems can be overcome and that favorable optical fiber preforms can be produced at a low cost by measuring the pressure loss with respect to the gas supply in the interstices between the quartz glass tube and the core glass rod, and by then controlling the gas supply rate in such a manner that the pressure loss can be maintained constant. The present invention has been accomplished based on the above findings. An object of the present invention is to provide a method for producing a favorable optical fiber preform at a low cost, which comprises favorable changing from gas supply state to a reduced pressure state, and thereby acquiring a long effective length of the quartz glass tube.

The object above is accomplished by a method for producing an optical fiber preform, which is a production method for an optical fiber preform comprising inserting a core glass rod for use in the optical fiber preform into the quartz glass tube for the optical fiber perform and then melting them in a vertical heating furnace to melt weld them together into a monolithic body, wherein the melting is started in such a state that the lower open edge of said quartz glass tube is placed inside the heating furnace and a gas is supplied from the upper edge or the tube, and after the lower edge portion of the quartz glass tube is drawn out from said heating furnace by melt deformation and stretching by gravitational force, the gas supply is cut off and the pressure is reduced.

As described above, the method for producing an optical fiber preform according to the present invention comprises starting melting in such a state that the lower open edge of said quartz glass tube is placed inside the heating furnace and a gas is supplied from the upper edge or the tube, and after the lower edge portion of the quartz glass tube is drawn out from said heating furnace by melt deformation and stretching by gravitational force, the gas supply is cut off and the pressure is reduced. The gas supply is preferably effected by measuring the fluctuation of the gas pressure by using a pressure measuring means provided in the vicinity of the upper open end of the quartz glass tube, and by then supplying the gas based on the measured values. By the control above, the positive pressure can be maintained constant even if the interstices between the quartz glass tube and the core glass rod is narrowed by melting. The switching from a positive pressure to the negative pressure is performed at the point the drawing out of the lower end portion of the quartz glass tube (or the lower end portion of the dummy tube in case a dummy tube is used) is recognized visually or by means of a detection sensor. Since the pressure is switched from a positive value to a negative value after the end portion of the side from which melting is initiated is drawn out of the heating furnace, the aperture area can be maintained sufficiently small and the viscosity can be sufficiently reduced. Hence, the suction of atmosphere can be prevented from occurring even if a sealed state should be immediately realized. Therefore, not only the contamination attributed to the contaminating substances inside the heating furnace can be avoided, but also the quartz glass tube can be effectively used free from any loss. The positive pressure referred above signifies a state in which the pressure is elevated to a value higher than the ordinary pressure by flowing a gas to the interstices between the quartz glass tube and the core glass rod as the gas used therein, there can be mentioned a cleaning gas, a contamination preventing gas, a gas for controlling OH groups, etc. more specifically, preferred are gases that do not impair the heating furnace, such as a clean $N_2$gas, $Ar_2$gas etc. The negative pressure as referred above signifies a state in which the pressure of the interstices between the quartz glass tube and the core glass rod is lowered to a value not higher than the ordinary pressure. The reduced pressure can be realized by sealing the lower end portion of the quartz glass tube and then sucking the gas and the like after connecting the upper end portion to a pressure reducing apparatus.

LIST OF REFERENCE NUMBERS USED IN FIG. 1

Figure 1:
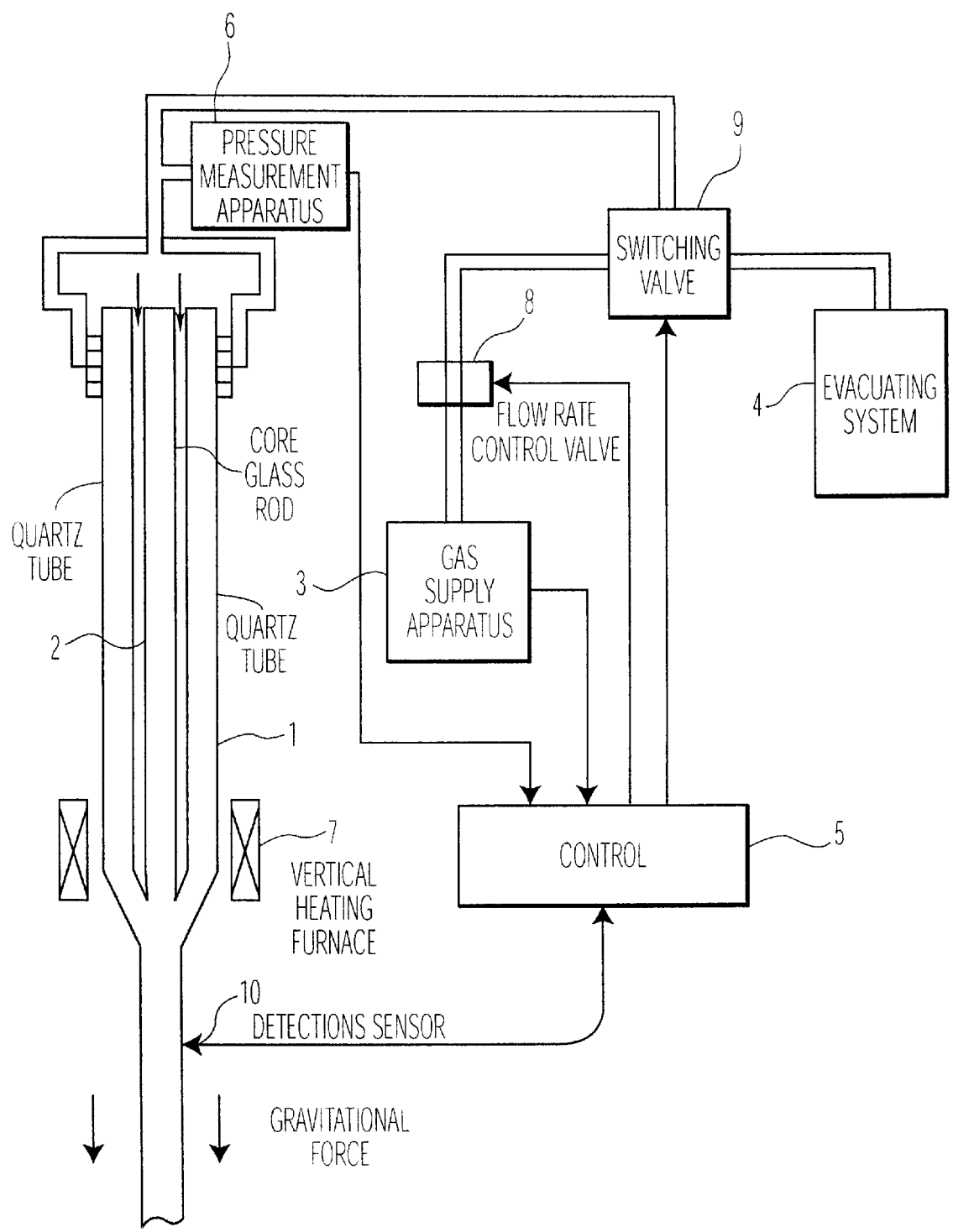
FIG. 1 is a schematic view of a method and apparatus for producing an optical fiber preform.

1 quartz glass tube
2 core glass rod
3 gas supply apparatus
4 evacuating system
5 control means
6 pressure measuring apparatus
7 vertical heating furnace
8 flow rate control valve
9 switching valve
10 detection sensor In FIG. 1 is shown a schematically drawn explanatory view for carrying out the method for producing an optical fiber preform. Referring to FIG. 1, a core glass rod 2 is inserted into a quartz glass tube 1, and the resulting product is fixed to a feeding mechanism (not shown) of a vertical apparatus for use in the rod in tube method. Then the switching valve 9 is switched to a gas supply path to introduce a gas from the supply apparatus 3 into the quartz glass tube 1 from the upper side while discharging the gas from the lower side of the quartz glass tube 1 for optical fiber preforms. The initial value of the gas supply rate is determined form the amount of the gas necessary in accordance with the aperture area and the like of the quartz glass tube. Upon initiating the gas supply at the initial value, the signal of a pressure measuring apparatus 6 is transmitted to a control means 5 in such a manner that the measured value of the pressure measuring apparatus 6 is maintained at the supply rate. The control means 5 performs the control so as to send a signal to the rate control valve 8, thereby making the pressure measuring apparatus 6 constant. After starting heating, the lower end portion of the quartz glass tube 1 is molten and stretched by gravitational force, and is discharged out from the lower side of the vertical heating furnace 7. The lower end portion of the quartz glass tube 1 discharged out of the furnace is then fixed to a preform drawing apparatus (not shown) of the vertical rod in tube apparatus. By means of the signal from the quartz glass tube detector sensor 10, the control means 5 detect that the lower end portion of the quartz glass tube is molten and discharged out from the lower side of the vertical heating furnace 7, and sends a signal to the flow rate control valve 8 and the switching valve 9 to stop the gas supply and to switch into the pressure reduced state by means of the evacuating system 4. The evacuating system 4 need not receive the signal from the control means 5 if the evacuating system is operated beforehand, but the operation may be initiated upon receiving a signal from the control means 5 to start the pressure reduction at the same time of switching the switching valve 9. Otherwise, because it is possible to observe the point at which the quartz glass tube is discharged out from the furnace, the detection sensor 10 can be omitted to manually switch the gas supply to a pressure reduced state.

In the production method according to the present invention, the gas supply state before initiating melt welding is smoothly changed to the reduced pressure state after starting melt welding. Thus, by preventing the expansion of the portion just above the reduced aperture portion of the quartz glass tube before starting melt welding and by flowing a gas until the quartz glass tube is sealed by melt welding, the contamination of the product due to contaminating substances can be prevented from occurring. As a result, an optical fiber preform free from incorporation of bubbles and foreign matter in the interface can be obtained.

What is claimed is:

1. A method for producing an optical fiber preform comprising inserting a core glass rod for use in the optical fiber preform into the quartz glass tube for the optical fiber preform and then welding them in a heating furnace to melt weld them together into a monolithic product, wherein the melting is started in such a state that the lower open edge of said quartz glass tube is placed inside the heating furnace and a gas is supplied from the upper edge of the tube, and after the lower edge portion of the quartz glass tube is drawn out from said heating furnace by melt deformation and stretching by the gravitational force, the gas supply is cut off and the pressure is reduced.

2. A method for producing an optical fiber preform as claimed in claim 1, wherein the gas supply is controlled based on a means for measuring the pressure provided in the vicinity of the upper edge of the quartz glass tube for use in the optical fiber preform.

\* \* \* \* \*